United States Patent

Hörold et al.

(10) Patent No.: US 9,732,202 B2
(45) Date of Patent: Aug. 15, 2017

(54) COMPOSITION COMPRISING A THERMOPLASTIC POLYMER AND A SYNERGISTIC MIXTURE OF DETERMINED AMINO ETHERS AND FINELY PARTICLED PHOSPHINATES

(71) Applicant: CLARIANT INTERNATIONAL LTD., Muttenz (CH)

(72) Inventors: Sebastian Hörold, Diedorf (DE); Matthias Zäh, Gersthofen (DE)

(73) Assignee: Clariant International Ltd., Muttenz (CH)

( * ) Notice: Subject to any disclaimer, the term of this patent is extended or adjusted under 35 U.S.C. 154(b) by 0 days.

(21) Appl. No.: 14/907,464

(22) PCT Filed: Jul. 14, 2014

(86) PCT No.: PCT/EP2014/001926
§ 371 (c)(1),
(2) Date: Jan. 25, 2016

(87) PCT Pub. No.: WO2015/010775
PCT Pub. Date: Jan. 29, 2015

(65) Prior Publication Data
US 2016/0177059 A1 Jun. 23, 2016

(30) Foreign Application Priority Data
Jul. 26, 2013 (DE) .................. 10 2013 012 487

(51) Int. Cl.
| | | |
|---|---|---|
| *C08K 5/53* | (2006.01) | |
| *C08K 5/5313* | (2006.01) | |
| *C08K 5/00* | (2006.01) | |
| *C08K 5/3435* | (2006.01) | |
| *C08K 5/3492* | (2006.01) | |
| *C08K 3/32* | (2006.01) | |

(52) U.S. Cl.
CPC .......... *C08K 5/5313* (2013.01); *C08K 5/0066* (2013.01); *C08K 5/3435* (2013.01); *C08K 5/3492* (2013.01); *C08K 5/53* (2013.01); *C08K 2003/329* (2013.01); *C08K 2201/003* (2013.01); *C08K 2201/005* (2013.01)

(58) Field of Classification Search
None
See application file for complete search history.

(56) References Cited

U.S. PATENT DOCUMENTS

| | | | |
|---|---|---|---|
| 6,599,963 B2 | 7/2003 | Horsey et al. | |
| 6,727,335 B2 * | 4/2004 | Sicken | C07F 9/485 524/612 |
| 8,853,307 B2 | 10/2014 | Butz | |
| 2010/0324182 A1 * | 12/2010 | Roth | C08K 3/32 524/101 |
| 2010/0324183 A1 | 12/2010 | Henze | |
| 2011/0237715 A1 * | 9/2011 | Xalter | C09K 21/12 524/100 |

FOREIGN PATENT DOCUMENTS

| | | |
|---|---|---|
| WO | WO 99/00450 | 1/1999 |
| WO | WO 2010/026230 | 3/2010 |
| WO | WO 2011/117266 | 3/2010 |
| WO | WO 2013/136285 | 9/2013 |

OTHER PUBLICATIONS

SpecialChem. "Clariant Launches Light Stabilizers Based on Hostavin NOW® Technology for UV Protection." Nov. 12, 2012. Retrieved from specialchem.com on Dec. 6, 2016.*
PCT International Search Report for PCT/EP2014/001926, dated Sep. 9, 2014.
English Translation of PCT International Preliminary Report on Patentability for PCP/EP2014/001926, dated Jan. 26, 2016.
Ullmann's Encyclopedia of Industrial Chemistry, 5th Ed., vol. A28, Weinheim, Chapter 6.1.5, 1996.
Hans Dominghaus, "Die Kunststoffe und ihre Eigenschaften", 5th Edition pp. 14-25, 1998.

* cited by examiner

*Primary Examiner* — Richard A Huhn
(74) *Attorney, Agent, or Firm* — Anthony A. Bisulca

(57) ABSTRACT

Compositions containing, as component (A), a finely particled phosphinic acid salt of formula (I) and/or a finely particled diphosphinic acid salt of formula (II) and/or the polymers thereof, as component (B), an aminoether of formula (III), and as component (C), a thermoplastic polymer.

15 Claims, No Drawings

COMPOSITION COMPRISING A THERMOPLASTIC POLYMER AND A SYNERGISTIC MIXTURE OF DETERMINED AMINO ETHERS AND FINELY PARTICLED PHOSPHINATES

The invention which follows comprises a composition composed of a thermoplastic polymer and a synergistic mixture of specific amino ethers and finely divided phosphinates.

The composition may be employed, in particular, as a flame retardant for thin-gauge materials, preferably for polyolefin sheetings and polyolefin fibers.

Polyolefins are increasingly being employed in applications where flame retardancy is required. Flame retardancy is nowadays typically achieved by addition of bromine or phosphorus compounds. However said compounds also have quite serious disadvantages. Bromine compounds markedly reduce the photostability of the olefins and can therefore be used in exterior applications only to a very limited extent. Phosphorus-containing flame retardants need to be employed in large amounts and are also often ineffective in thin-gauge applications such as fibers and sheetings.

U.S. Pat. No. 6,599,963A1 describes polymeric substrates comprising a flame retardant system comprising a sterically hindered amine and a brominated flame retardant. WO99/00450 describes the use of a sterically hindered amine compound as a flame retardant for polymers.

WO2010/026230 describes mixtures of cyclic phosphonates, one or more 1,3,5-triazine compounds and sterically hindered amino ethers. Said document describes polyethylene sheetings meeting the fire classification DIN 4102 B2. The disadvantage is that transparent sheetings cannot be prepared.

WO2011/117266 describes polymeric substances comprising a salt of a phosphinic acid and a tetraalkylpiperidine or a tetraalkylpiperazine derivative. Polypropylene achieves fire classification V-2 with the addition of 8% flame retardant. The mixture is unsuitable for sheetings and fibers due to the high filler content and the particle size of the phosphinic acid salt employed.

Owing to their chemical reactivity which is required for flame retardancy at high temperatures flame retardants may impair the processing stability of plastics materials. Increased polymer degradation, crosslinking reactions, outgassing or discoloration may occur, for example. These effects occur in attenuated form, if at all, for plastics material processing in the absence of flame retardant.

The difficulty with incorporation of the sterically hindered amines described in WO99/00450 into sheetings or fibers is that odor and/or discoloration problems are encountered during incorporation. Furthermore, compounds of low molecular weight may migrate out of the plastics material.

It is accordingly an object of the present invention to provide novel compositions in which no migration is observed and which show good mechanical properties, do not undergo discoloration, meet important fire classifications and show sufficient UV stability.

The present invention thus relates to compositions comprising as component (A) a finely divided phosphinic acid salt of formula (I) and/or diphosphinic acid salt of formula (II) and/or polymers thereof,

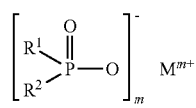
(I)

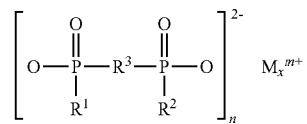
(II)

where
R$^1$, R$^2$ are identical or different and are H, C$_1$-C$_6$-alkyl, linear or branched and/or aryl;
R$^3$ is C$_1$-C$_{10}$-alkylene, linear or branched, C$_6$-C$_{10}$-arylene, -alkylarylene or -arylalkylene;
M is Mg, Ca, Al, Sb, Sn, Ge, Ti, Fe, Zr, Ce, Bi, Sr, Mn, Li, Na, K and/or a protonated nitrogen base;
m is 1 to 4; n is 1 to 4, x is 1 to 4,
having a particle size d$_{50}$ of less than 20 µm;
as component (B) an amino ether of formula (III),

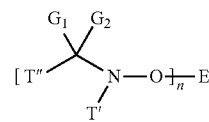
(III)

wherein
n may be less than or equal to the number of carbon atoms in E and
E is C$_1$- to C$_{1000000}$-alkyl or C$_5$-C$_6$-cycloalkyl, wherein the alkyl chain may comprise alkyl substituents, aromatic substituents and polar groups as substituents and may be interrupted by alkene units and/or heteroatoms;
wherein
G1 and G2 may be identical or different and independently of one another are hydrogen, halogen, NO$_2$, cyano, CONR$_5$R$_6$, (R$_9$)COOR$_4$, C(O)—R$_7$, OR$_8$, SR$_8$, NHR$_8$, N(R$_{18}$)$_2$, carbamoyl, di(C$_1$-C$_{18}$-alkyl)carbamoyl, C(=NR$_5$)(NHR$_6$), C$_1$-C$_{18}$-alkyl; C$_3$-C$_{18}$-alkenyl; C$_3$-C$_{18}$-alkynyl, C$_7$-C$_9$-phenylalkyl, C$_3$-C$_{12}$-cycloalkyl or C$_2$-C$_{12}$-heterocycloalkyl; C$_2$-C$_{18}$-alkyl interrupted by at least one O atom and/or by
—NR$_5$—;
C$_6$-C$_{10}$-aryl;
phenyl oder naphthyl, in each case substituted with C$_1$-C$_4$-alkyl, C$_1$-C$_4$-alkoxy, C$_1$-C$_4$-alkylthio, halogen, cyano, hydroxy, carboxy, COOR$_{21}$, C(O)—R$_{22}$, C$_1$-C$_4$-alkylamino or di(C$_1$-C$_4$-alkyl)amino;
or
G1 and G2 together with the carbon atom to which they are bonded form a C$_3$-C$_{12}$-ring;
T' is hydrogen, a primary C$_1$-C$_{18}$-alkyl, a secondary C$_3$-C$_{18}$-alkyl, a tertiary C$_4$-C$_{18}$-alkyl or a phenyl group, each of which is unsubstituted or substituted with halogen, OH, COOR$_{21}$ or C(O)—R$_{22}$; or C$_5$-C$_{12}$-cycloalkyl or C$_5$-C$_{12}$-cycloalkyl interrupted by at least one O or —N(R$_{18}$)—; or a polycyclic alkyl radical having 7 to 18 carbon atoms, or the identical radical interrupted by at least one —O— or —N(R$_{18}$)—; or T' is C-(G$_1$)(G$_2$)-T";
T" is hydrogen, halogen, NO$_2$, cyano or a monovalent organic radical having 1 to 50 carbon atoms; or T" and T' together form a divalent organic connecting group which, together with the sterically hindered amine nitrogen atom and the quaternary carbon atom substituted with G$_1$ and G$_2$, form an optionally substituted five- or six-membered ring structure, and $R_4$ is hydrogen, $C_1$-$C_{18}$-alkyl, phenyl, an alkali metal ion or a tetraalkylammonium cation;

$R_5$ and $R_6$ are independently of each other hydrogen, $C_1$-$C_{18}$-alkyl, $C_2$-$C_{18}$-alkyl substituted with hydroxy or, taken together, form a $C_2$-$C_{12}$-alkylene bridge or a $C_2$-$C_{12}$-alkylene bridge interrupted by —O— or/and —N($R_{18}$)—;

$R_7$ is hydrogen, $C_1$-$C_{18}$-alkyl or $C_6$-$C_{10}$-aryl;

$R_8$ is hydrogen, $C_1$-$C_{18}$-alkyl or $C_2$-$C_{18}$-hydroxyalkyl;

$R_9$ is $C_1$-$C_{12}$-alkylene or a bond;

$R_{18}$ is $C_1$-$C_{12}$-alkyl or phenyl, unsubstituted or substituted by halogen, OH, COOR$_{21}$ or C(O)—R$_{22}$, $R_{21}$ is hydrogen, an alkali metal atom or $C_1$-$C_{18}$-alkyl;

$R_{22}$ is $C_1$-$C_{18}$-alkyl;

and as component (C) a thermoplastic polymer.

It is particularly preferable when $R^1$, $R^2$ are identical or different and are methyl, ethyl, n-propyl, isopropyl, n-butyl, tert-butyl, n-pentyl, and/or phenyl.

It is preferable when $R^3$ is methylene, ethylene, n-propylene, isopropylene, n-butylene, tert-butylene, n-pentylene, n-octylene or n-dodecylene; phenylene or naphthylene; methylphenylene, ethylphenylene, tert-butylphenylene, methylnaphthylene, ethylnaphthylene or tert-butylnaphthylene; phenylmethylene, phenylethylene, phenylpropylene or phenylbutylene.

It is preferable when the average particle size $d_{50}$ of component (A) is less than 10 μm.

It is particularly preferable when the average particle size $d_{50}$ of component (A) is less than 5 μm.

It is preferable when E is $C_{60}$- to $C_{1000000}$-alkyl.

It is preferable when in component (A) $R^1$ and $R^2$ are each ethylene.

It is preferable when in component (A) M is aluminum.

Preference is given to a composition where component B is a reaction product of a fatty acid 2,2,6,6-tetramethylpiperidin-4-yl-hexadecanoate and 2,2,6,6-tetramethylpiperidin-4-yl-octadecanoate with an oxidized polyethylene of the formula

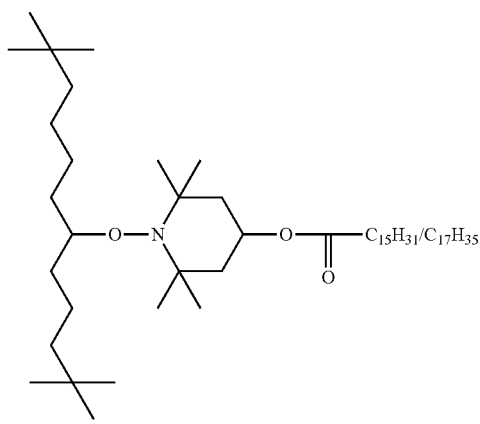

wherein $C_{15/17}$ are the main components and the alkyl radical at the N—O— has an average molecular weight of about 2000 (CAS No. 86403-32-9).

It is preferable when the composition comprises 0.2 to 10 wt % of component (A), 0.1 to 5 wt % of component (B) and 85 to 99.7 wt % of component (C).

It is particularly preferable when the composition comprises 0.5 to 5 wt % of component (A), 0.2 to 2 wt % of component (B) and 93 to 99.3 wt % of component (C).

In particular the composition comprises 0.2 to 2 wt % of component (A), 0.5 to 2 wt % of component (B) and 96 to 99.7 wt % of component (C).

It is preferable when the thermoplastic polymer is a polyolefin.

It is preferable when the composition is processed into a transparent sheeting of 50-500 μm in thickness.

Finally, the invention also comprises molded articles, films and fibers produced with the composition as claimed in one or more of claims 1 to 12.

It is preferable when the particle size of the phosphinate is adjusted via a milling and sifting process.

It is particularly preferable when E is $C_5$-$C_6$ cycloalkyl.

It is particularly preferable when E is $C_{60}$- to $C_{1000000}$-alkyl.

It is preferable when E is a wax.

It has now been found that, surprisingly, mixtures of finely divided phosphinic acid salts having a particle size d95 of <20 μm with amino ether compounds having the structure R—O—N where R is an alkyl group and N is a sterically hindered amine are very effective flame retardants in polyolefin sheetings and the sheetings are transparent and light-stable. The compounds are thermally stable and show no discoloration or odor problems on incorporation into polymers. The R—O—N compounds preferably have a high molecular weight and therefore show no propensity for migration out of the plastics materials.

Waxes are natural or synthetic materials which at 20° C. are solid and kneadable and above 40° C. melt without decomposition and have a low viscosity. Waxes undergo transition into the molten, low-viscosity state generally between 50° C. and 90° C. and in exceptional cases at up to about 200° C. A distinction is made between natural waxes such as carnauba wax, chemically modified waxes such as montan ester waxes and synthetic waxes such as polyethylene waxes.

It is preferable when the waxes are hydrocarbon waxes, ester waxes, oxidized polyolefin waxes, oxidized hydrocarbon waxes, amide waxes, wax acids, wax soaps, natural waxes and/or combinations of these components.

Examples of suitable natural waxes include plant waxes such as carnauba or candelilla wax or waxes of animal origin, for example shellac wax.

It is also possible to use polar or nonpolar fully synthetic waxes, for example polyolefin waxes. Nonpolar polyolefin waxes may be produced by thermal degradation of branched or unbranched polyolefin plastics materials or by direct polymerization of olefins.

Polar polyolefin waxes are formed by appropriate modification of nonpolar waxes, for example by oxidation with air or by grafting on polar olefin monomers, for example α,β-unsaturated carboxylic acids and/or derivatives thereof, for instance acrylic acid or maleic anhydride. Polar polyolefin waxes may further be prepared by copolymerization of ethylene with polar comonomers, for example vinyl acetate or acrylic acid, furthermore by oxidative degradation of relatively high molecular weight non-waxy ethylene homo- and copolymers. Corresponding examples may be found, for instance, in Ullmann's Encyclopedia of Industrial Chemistry, 5th Ed., Vol. A 28, Weinheim 1996, Ch. 6.1.5.

Suitable polyolefin waxes include degradation waxes prepared by thermal degradation of ethylene or 1-olefin homo- and copolymers, for example polyethylene or polypropylene.

Also suitable are polar waxes prepared by modification of the abovementioned polyolefin waxes. Modification is achieved by processes known per se, for example by oxidation with oxygen-containing gases, for example air, and/or by grafting with α,β-unsaturated acids or derivatives thereof, for example acrylic acid, acrylate esters, maleic anhydride, maleic acid.

Specifically, the present invention relates to the use of a synergistic mixture of finely divided phosphinate with amino ethers of formula D and D' as a flame retardant and multifunctional additive,

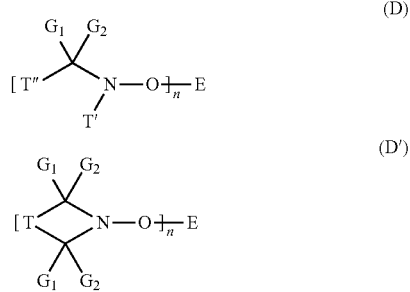

wherein n may be 1 to 50.

E is $C_1$- to $C_{1000000}$-alkyl or $C_5$-$C_6$-cycloalkyl, wherein the alkyl chain may comprise alkyl substituents, aromatic substituents and polar groups as substituents.

The alkyl chain may also be interrupted by alkene units and heteroatoms.

Specific examples of amino ethers according to the invention are

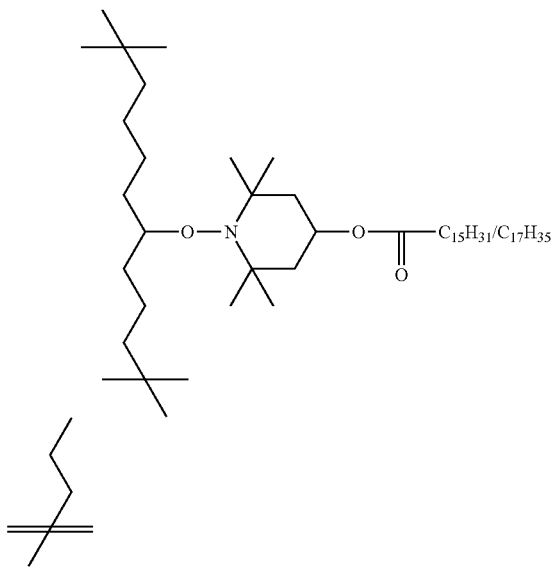

The amino ethers composed of wax (E) and sterically hindered amine are thermally stable and neither decompose the polymers during processing nor affect the production process of the plastics material molding compounds. The reaction products composed of wax and sterically hindered amine are not volatile under typical production and processing conditions for thermoplastic polymers and do not have a propensity for migration out of the plastics material.

Polymers that may be employed in accordance with the invention are thermoplastic polymers.

According to Hans Dominghaus in "Die Kunststoffe and ihre Eigenschaften", 5th Edition (1998), pages 14-25, thermoplastic polymers (component C) are to be understood as meaning polymers whose molecular chains have no side branchings or else varying numbers of side branchings of greater or lesser length and which soften when heated and are virtually infinitely moldable.

The polymers are preferably polymers of mono- and diolefins, for example polypropylene, polyisobutylene, polybutene-1, poly-4-methylpentene-1, polyisoprene or polybutadiene, and polymers of cycloolefins, for example of cyclopentene or norbornene; and also polyethylene (which may optionally be crosslinked), for example high-density polyethylene (HDPE), high-density, high-molecular-weight polyethylene (HDPE-HMW), high-density, ultrahigh-molecular-weight polyethylene (HDPE-UHMW), medium-density polyethylene (MDPE), low-density polyethylene (LDPE), linear low-density polyethylene (LLDPE), branched low-density polyethylene (BLDPE), and mixtures thereof.

The polymers are preferably copolymers of mono- and diolefins with one another or with other vinyl monomers, for example ethylene-propylene copolymers, linear low-density polyethylene (LLDPE) and mixtures thereof with low-density polyethylene (LDPE), propylene-butene-1 copolymers, propylene-isobutylene copolymers, ethylene-butene-1 copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers and copolymers thereof with carbon monoxide, or ethylene-acrylic acid copolymers and salts thereof (ionomers), and also terpolymers of ethylene with propylene and a diene such as hexadiene, dicyclopentadiene or ethylidenenorbornene; and also mixtures of such copolymers with one another, for example polypropylene/ethylene-propylene copolymers, LDPE/ethylene-vinyl acetate copolymers, LDPE/ethylene-acrylic acid copolymers, LLDPE/ethylene-vinyl acetate copolymers, LLDPE/ethylene-acrylic acid copolymers and alternating or random polyalkylene/carbon monoxide copolymers and mixtures thereof with other polymers, for example polyamides.

The polymers are preferably hydrocarbon resins (for example $C_5$-$C_9$), including hydrogenated modifications thereof (for example tackifier resins) and mixtures of polyalkylenes and starch.

The polymers are preferably polystyrene (Polystyrol 143E (BASF), poly(p-methylstyrene), poly(alpha-methylstyrene).

The polymers are preferably copolymers of styrene or alpha-methylstyrene with dienes or acrylic derivatives, for example styrene-butadiene, styrene-acrylonitrile, styrene-alkyl methacrylate, styrene-butadiene-alkyl acrylate and methacrylate, styrene-maleic anhydride, styrene-acrylonitrile-methyl acrylate; high impact resistance mixtures of styrene copolymers and another polymer, for example a polyacrylate, a diene polymer or an ethylene-propylene-diene terpolymer; and block copolymers of styrene, for example styrene-butadiene-styrene, styrene-isoprene-styrene, styrene-ethylene/butylene-styrene or styrene-ethylene/propylene-styrene.

The polymers are preferably graft copolymers of styrene or alpha-methylstyrene, for example styrene on polybutadiene, styrene on polybutadiene-styrene or polybutadiene-acrylonitrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene, styrene and alkyl acrylates/alkyl methacrylates on polybutadiene, styrene and acrylonitrile on ethylene-propylene-diene terpolymers, styrene and acrylonitrile on polyalkyl acrylates or polyalkyl methacrylates, styrene and acrylonitrile on acrylate-butadiene copolymers, and mixtures thereof, such as are known, for example, as ABS, MBS, ASA or AES polymers.

The polymers are preferably halogenated polymers, for example polychloroprene, chlorine rubber, chlorinated and brominated copolymer of isobutylene-isoprene (halobutyl rubber), chlorinated or chlorosulfonated polyethylene, copolymers of ethylene and chlorinated ethylene, epichlorohydrin homo- and copolymers, especially polymers of halogenated vinyl compounds, for example polyvinyl chloride, polyvinylidene chloride, polyvinyl fluoride, polyvinylidene fluoride; and copolymers thereof, such as vinyl chloride-vinylidene chloride, vinyl chloride-vinyl acetate or vinylidene chloride-vinyl acetate.

The polymers are preferably polymers deriving from alpha, beta-unsaturated acids and derivatives thereof, such as polyacrylates and polymethacrylates, butyl acrylate-impact-modifed polymethyl methacrylates, polyacrylam ides and polyacrylonitriles and copolymers of the cited monomers with one another or with other unsaturated monomers, for example acrylonitrile-butadiene copolymers, acrylonitrile-alkyl acrylate copolymers, acrylonitrile-alkoxyalkyl acrylate copolymers, acrylonitrile-vinyl halide copolymers or acrylonitrile-alkyl methacrylate-butadiene terpolymers.

The polymers are preferably polymers deriving from unsaturated alcohols and amines/from the acyl derivatives or acetals thereof, such as polyvinyl alcohol, polyvinyl acetate, stearate, benzoate or maleate, polyvinyl butyral, polyallyl phthalate, polyallylmelamine; and copolymers thereof with olefins.

The polymers are preferably homo- and copolymers of cyclic ethers, such as polyalkylene glycols, polyethylene oxide, polypropylene oxide or copolymers thereof with bisglycidyl ethers.

The polymers are preferably polyacetals, such as polyoxymethylene, and those polyoxymethylenes which comprise comonomers, for example ethylene oxide; polyacetals modified with thermoplastic polyurethanes, acrylates or MBS.

The polymers are preferably polyphenylene oxides and sulfides and mixtures thereof with styrene polymers or polyamides.

The polymers are preferably polyurethanes deriving from polyethers, polyesters and polybutadienes having both terminal hydroxyl groups and aliphatic or aromatic polyisocyanates, and the precursors thereof.

The polymers are preferably polyamides and copolyamides deriving from diamines and dicarboxylic acids and/or from aminocarboxylic acids or the corresponding lactams, such as
polyamide 2/12,
polyamide 4 (poly-4-aminobutyric acid, Nylon 4, DuPont),
polyamide 4/6 (poly(tetramethyleneadipamide), Nylon 4/6, DuPont),
polyamide 6 (polycaprolactam, poly-6-aminohexanoic acid, Nylon 6, DuPont, Akulon K122, DSM; Zytel 7301, DuPont; Durethan B 29, Bayer),
polyamide 6/6 (poly(N,N'-hexamethyleneadipamide), Nylon 6/6, DuPont, Zytel 101, DuPont; Durethan A30, Durethan AKV, Durethan AM, Bayer; Ultramid A3, BASF),
polyamide 6/9 (poly(hexamethylenenonanediamide), Nylon 6/9, DuPont),
polyamide 6/10 (poly(hexamethylenesebacamide), Nylon 6/10, DuPont),
polyamide 6/12 (poly(hexamethylenedodecanediamide), Nylon 6/12, DuPont),
polyamide 6/66 (poly(hexamethyleneadipamide-co-caprolactam), Nylon 6/66, DuPont),
polyamide 7 (poly-7-aminoheptanoic acid, Nylon 7, DuPont),
polyamide 7,7 (polyheptamethylenepimelamide, Nylon 7,7, DuPont), polyamide 8 (poly-8-aminooctanoic acid, Nylon 8, DuPont),
polyamide 8,8 (polyoctamethylenesuberamide, Nylon 8,8, DuPont),
polyamide 9 (poly-9-aminononanoic acid, Nylon 9, DuPont),
polyamide 9,9 (polynonamethyleneazelamide, Nylon 9,9, DuPont),
polyamide 10 (poly-10-aminodecanoic acid, Nylon 10, DuPont),
polyamide 10,9 (poly(decamethyleneazelamide), Nylon 10,9, DuPont),
polyamide 10,10 (polydecamethylenesebacamide, Nylon 10,10, DuPont),
polyamide 11 (poly-11-aminoundecanoic acid, Nylon 11, DuPont),
polyamide 12 (polylauryllactam, Nylon 12, DuPont, Grillamid L20, Ems Chemie), aromatic polyamides based on m-xylene, diamine and adipic acid; polyamides produced from hexamethylenediamine and iso- and/or terephthalic acid (polyhexamethyleneisophthalamide polyhexamethylenterephthalamide) and optionally an elastomer as a modifier, for example poly-2,4,4-trimethylhexamethyleneterephthalam ide or poly-m-phenyleneisophthalamide.

Block copolymers of the abovementioned polyamides with polyolefins, olefin copolymers, ionomers or chemically bonded or grafted elastomers; or with polyethers, for example with polyethylene glycol, polypropylene glycol or polytetramethylene glycol. Furthermore, EPDM- or ABS-modified polyam ides or copolyamides; and polyamides condensed during processing ("RIM polyamide systems").

The polymers are preferably polyureas, polyim ides, polyamidimides, polyetherim ides, polyesterim ides, polyhydantoins and polybenzimidazoles.

The polymers are preferably polyesters deriving from dicarboxylic acids and dialcohols and/or from hydroxycarboxylic acids or the corresponding lactones, such as polyethylene terephthalate, polybutylene terephthalate (Celanex® 2500, Celanex® 2002, Celanese; Ultradur®, BASF), poly-1,4-dimethylolcyclohexane terephthalate, polyhydroxybenzoates, and block polyether esters deriving from polyethers with hydroxyl end groups; furthermore polyesters modified with polycarbonates or MBS.

The polymers are preferably polycarbonates and polyester carbonates.

The polymers are preferably polysulfones, polyether sulfones and polyether ketones.

The polymers are preferably mixtures (polyblends) of the abovementioned polymers, for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

The polymers are preferably polyolefins such as polyethylene, polypropylene or ethylene-vinyl acetate.

The polymeric molded articles, films, threads and fibers are characterized in that polyolefins such as polyethylene, polypropylene, ethylene-vinyl acetate are concerned.

The polymeric films are characterized in that they are transparent.

Processing comprises premixing the components A and B as powder and/or pellets in a mixer and subsequently homogenizing said components in the polymer melt (corresponding to component C) in a compounding apparatus (for example a twin-screwed extruder). The melt is typically extruded, cooled and pelletized. The components A and B may also be introduced directly into the compounding apparatus separately via a metering unit.

It is likewise possible to admix the components A and B with prepared polymer pellets/powder (component C) and to process the mixture directly, for example on a film blowing line.

The additives are preferably antioxidants, antistats, blowing agents, further flame retardants, heat stabilizers, impact modifiers, processing aids, glidants, light stabilizers, antidrip agents, compatibilizers, reinforcers, fillers, nucleating agents, additives for laser marking, hydrolysis stabilizers, chain extenders, pigments, softeners and/or plasticizers.

The flame retardant plastics material molding compounds are suitable for producing molded articles, films, threads and fibers, for example by injection molding, extrusion, blow molding or press molding.

The compositions according to the invention are particularly suitable for blown films. Blown films feature an extraordinarily high film cohesion and particularly high perforation and tear propagation resistance. There are sheetings composed of only one layer (so-called monolayer blown film) and sheetings manufactured from a plurality of layers (so-called coextruded blown film). A coextruded blown film provides for combining the positive properties of different materials in one sheeting.

EXAMPLES

Employed Inventive Materials

Component A
Exolit® OP 935, aluminum salt of diethylphosphinic acid, referred to hereinbelow as Depal d50 2-3 µm, particle size d95<10 µm, particle size d50 2-3 µm, Clariant, Frankfurt, DE Component B
Hostavin® NOW: 2,2,6,6-tetramethylpiperidin-4-yl-hexadecanoate and 2,2,6,6-tetramethylpiperidin-4-yl-octadecanoate, reaction product with an oxidized polyethylene wax, Clariant, Frankfurt, DE, referred to hereinbelow as HALS-NO wax.

Flamestab® NOR 116: 1,3-propanediamine, N,N"-1,2-ethandiylbis, reaction product with cyclohexane and the peroxidized N-butyl-2,2,6,6-tetramethyl-4-piperidinamine-2,4,6-trichloro-1,3,5-triazine reaction product, CAS No. 191680-81-6, from BASF, Ludwigshafen, DE Component C
Sabic LDPE 2102 Z 500, low-density polyethylene, MFR 1.7-2.2 g/10 min, from Sabic, Geleen, the Netherlands, referred to hereinbelow as LDPE Comparator:
Exolit® OP 1230, aluminum salt of diethylphosphinic acid, referred to hereinbelow as Depal d50 30 µm, particle size d95<100 µm, particle size d50 about 30 µm Aflammit® PCO 800: melamine salt of a phosphonic acid, Thor, Speyer, DE Mixing of the polymer (component C) and the additives (components A, B and others) was performed in an Arenz KL 1 single-screw extruder at a temperature of 180-210° C. at 100 rpm.

The production of blown films of 200/400 µm in thickness was performed on a Collin BL 180/400 blown film line at 160-200° C.

Determination of the low flammability of the sheetings was performed according to DIN 4102 B2 with test specimens having dimensions of 190*90 mm which are vertically clamped and subjected to flame exposure at their lower edge with 20 mm-high flames from a gas burner for 15 seconds. The test is passed if over a period of 20 seconds the tip of the flames does not reach a reference mark on the test specimens which is disposed at a distance of 150 mm from the flame-exposed lower edge.

Table 1 shows the fire test results for the sheetings of 200 and 400 µm in thickness with Exolit OP 935 and Hostavin NOW alone (V1 and V2) and the inventive combinations of Exolit OP 935 and Hostavin NOW (B1-B3). The fire test DIN 4102 B2 is only passed for 200 and 400 µm with a combination of both products.

TABLE 1

Fire tests according to DIN 4102 B2 on 200 and 400 µm LDPE sheetings.

| Examples | V1 | V2 | B1 | B2 | B3 |
|---|---|---|---|---|---|
| LDPE | 98 | 98 | 98 | 98 | 98 |
| HALS-NO wax | 2 | | 1 | 1.5 | 0.5 |
| Depal d50 2-3 µm | | 2 | 1 | 0.5 | 1.5 |
| DIN 4102 fire test 200 µm | no | no | yes | yes | no |
| DIN 4102 fire test 400 µm | no | no | yes | yes | no |

TABLE 2

Comparator formulations

| Example | B2 | B3 | V3 | V4 | V5 |
|---|---|---|---|---|---|
| LDPE | 98 | 98 | 98 | | |
| HALS-NO wax | 1.5 | | | 1.5 | 0.5 |
| Flamestab NOR 116 | | 1.5 | | | 0.5 |
| Aflammit PCO 800 | | | 0.5 | 2.5 | 2.5 |
| Depal d50 2-3 µm | 0.5 | 0.5 | | | |
| DIN 4102 B2 200 µm | yes | yes | no | yes | yes |
| transparency | clear | clear | cloudy | cloudy | cloudy |
| odor | no | unpleasant | no | no | unpleasant |
| color | colorless | yellowish | colorless | colorless | yellowish |

Table 2 compares the inventive combination of finely divided phosphinate salt and amino ether with a combination of phosphonate and with an amino ether according to WO 2010/026230 (V3, V4, V5). Transparent sheetings are obtained only through the inventive combination of finely divided phosphinate with amino ether. Employing HALS-NO wax further prevents discoloration and unpleasant odor during processing.

It is apparent from table 3 that only the combination of amino ether with finely divided phosphinate (B4, B5) affords transparent polyethylene sheetings.

TABLE 3

Comparison of finely divided and normal particle size Depal

| Example | V6 | B4 | V7 | B5 | V8 |
|---|---|---|---|---|---|
| LDPE | 100 | 98 | 98 | 98 | 98 |
| HALS-NO wax |  | 1 | 1 |  |  |
| Flamestab NOR 116 |  |  |  | 1 | 1 |
| Depal d50 3 μm* |  | 1 |  | 1 |  |
| Depal d50 30 μm** |  |  | 1 |  | 1 |
| % transmission | 88 | 87 | 85 | 87 | 85 |
| transparency (doubled) | 66 | 63 | 59 | 66 | 59 |
| DE*ab | 0.03 | 0.33 | 0.76 | 0.29 | 0.81 |
| Haze (D1003-97) © | 16 | 16 | 20 | 16 | 35 |

The haze number is a measure for clouding of the sheetings. The inventive combinations of NOR HALS with finely divided Depal show markedly lower clouding values compared to the comparative examples with normal Depal particle size. The sheetings with finely divided Depal further show improved mechanical properties (tensile test). The transparency of the sheetings with finely divided Depal is markedly higher than with standard material. DE*ab denotes the degree of discoloration compared to a white standard. The inventive examples show markedly reduced discoloration compared to the comparative examples. The use of finely divided Depal additionally has a positive effect on fire characteristics. While all four examples from table 3 meet the B2 classification, the sheetings with finely divided Depal show markedly shorter afterflame times and smaller destroyed regions.

The invention claimed is:

1. A composition comprising as component (A) a finely divided phosphinic acid salt of formula (I), diphosphinic acid salt of formula (II), and polymers thereof,

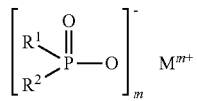

(I)

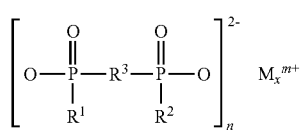

(II)

wherein

R$^1$, R$^2$ are identical or different and are H, $C_1$-$C_6$-alkyl, linear or branched aryl or combinations thereof;

R$^3$ is $C_1$-$C_{10}$-alkylene, linear or branched, $C_6$-$C_{10}$-arylene, -alkylarylene or -arylalkylene;

M is Mg, Ca, Al, Sb, Sn, Ge, Ti, Fe, Zr, Ce, Bi, Sr, Mn, Li, Na, K, a protonated nitrogen base or a combination thereof;

m is 1 to 4; n is 1 to 4, x is 1 to 4, having a particle size $d_{50}$ of less than 20 μm;

as component (B) an amino ether of formula (III),

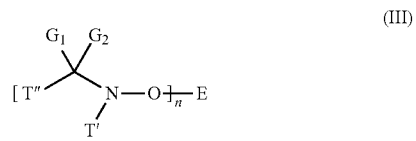

wherein n may be less than or equal to the number of carbon atoms in E and

E is $C_1$- to $C_{1000000}$-alkyl or $C_5$-$C_6$-cycloalkyl, wherein the alkyl chain may comprise alkyl substituents, aromatic substituents and polar groups as substituents and may be interrupted by alkene units heteroatoms or a combination thereof;

wherein

G1 and G2 may be identical or different and independently of one another are hydrogen, halogen, $NO_2$, cyano, $CONR_5R_6$, $(R_9)COOR_4$, $C(O)$—$R_7$, $OR_8$, $SR_8$, $NHR_8$, $N(R_{18})_2$, carbamoyl, di($C_1$-$C_{18}$-alkyl)carbamoyl, $C(=NR_5)(NHR_6)$, $C_1$-$C_{18}$-alkyl; $C_3$-$C_{18}$-alkenyl; $C_3$-$C_{18}$-alkynyl, $C_7$-$C_9$-phenylalkyl, $C_3$-$C_{12}$-cycloalkyl or $C_2$-$C_{12}$-heterocycloalkyl; $C_2$-$C_{18}$-alkyl interrupted by at least one O atom, by —$NR_5$— or a combination thereof;

$C_6$-$C_{10}$-aryl;

phenyl oder naphthyl, in each case substituted with $C_1$-$C_4$-alkyl, $C_1$-$C_4$-alkoxy, $C_1$-$C_4$-alkylthio, halogen, cyano, hydroxy, carboxy, $COOR_{21}$, $C(O)$—$R_{22}$, $C_1$-$C_4$-alkylamino or di($C_1$-$C_4$-alkyl)amino;

or

G1 and G2 together with the carbon atom to which they are bonded form a $C_3$-$C_{12}$-ring;

T' is hydrogen, a primary $C_1$-$C_{18}$-alkyl, a secondary $C_3$-$C_{18}$-alkyl, a tertiary $C_4$-$C_{18}$-alkyl or a phenyl group, each of which is unsubstituted or substituted with halogen, OH, $COOR_{21}$ or $C(O)$—$R_{22}$; or $C_5$-$C_{12}$-cycloalkyl or $C_5$-$C_{12}$-cycloalkyl interrupted by at least one O or —$N(R_{18})$—; or a polycyclic alkyl radical having 7 to 18 carbon atoms, or the identical radical interrupted by at least one —O— or —$N(R_{18})$—; or T' is $C$-$(G_1)(G_2)$-T";

T" is hydrogen, halogen, $NO_2$, cyano or a monovalent organic radical having 1 to 50 carbon atoms; or T" and T' together form a divalent organic connecting group which, together with the sterically hindered amine nitrogen atom and the quaternary carbon atom substituted with $G_1$ and $G_2$, form an optionally substituted five- or six-membered ring structure, and $R_4$ is hydrogen, $C_1$-$C_{18}$-alkyl, phenyl, an alkali metal ion or a tetraalkylammonium cation;

$R_5$ and $R_6$ are independently of each other hydrogen, $C_1$-$C_{18}$-alkyl, $C_2$-$C_{18}$-alkyl substituted with hydroxy or, taken together, form a $C_2$-$C_{12}$-alkylene bridge or a $C_2$-$C_{12}$-alkylene bridge interrupted by —O—, —$N(R_{18})$— or a combination thereof;

$R_7$ is hydrogen, $C_1$-$C_{18}$-alkyl or $C_6$-$C_{10}$-aryl;

$R_8$ is hydrogen, $C_1$-$C_{18}$-alkyl or $C_2$-$C_{18}$-hydroxyalkyl;

$R_9$ is $C_1$-$C_{12}$-alkylene or a bond;

$R_{18}$ is $C_1$-$C_{12}$-alkyl or phenyl, unsubstituted or substituted by halogen, OH, $COOR_{21}$ or $C(O)$—$R_{22}$;

$R_{21}$ is hydrogen, an alkali metal atom or $C_1$-$C_{18}$-alkyl;

$R_{22}$ is $C_1$-$C_{18}$-alkyl;

and as component (C) a thermoplastic polymer.

2. The mixture as claimed in claim 1, wherein $R^1$, $R^2$ are identical or different and are methyl, ethyl, n-propyl, isopropyl, n-butyl, tert-butyl, n-pentyl, phenyl or a combination thereof.

3. The mixture as claimed in claim 1, wherein $R^3$ is methylene, ethylene, n-propylene, isopropylene, n-butylene, tert-butylene, n-pentylene, n-octylene or n-dodecylene; phenylene or naphthylene; methylphenylene, ethylphenylene, tert-butylphenylene, methylnaphthylene, ethylnaphthylene or tert-butylnaphthylene; phenylmethylene, phenylethylene, phenylpropylene or phenylbutylene.

4. The mixture as claimed in claim 1, wherein the average particle size d50 of component (A) is less than 10 μm.

5. The mixture as claimed in claim 1, wherein the average particle size d50 of component (A) is less than 5 μm.

6. The mixture as claimed in claim 1, wherein E is $C_{60}$- to $C_{1000000}$-alkyl.

7. The mixture as claimed in claim 1, wherein in component (A) $R^1$ and $R^2$ are each ethylene.

8. The mixture as claimed in claim 1, wherein in component (A) M is aluminum.

9. The mixture as claimed in claim 1, wherein component B is a reaction product of a fatty acid 2,2,6,6-tetramethyl-piperidin-4-yl-hexadecanoate and 2,2,6,6-tetramethylpiperidin-4-yl-octadecanoate with an oxidized polyethylene of the formula

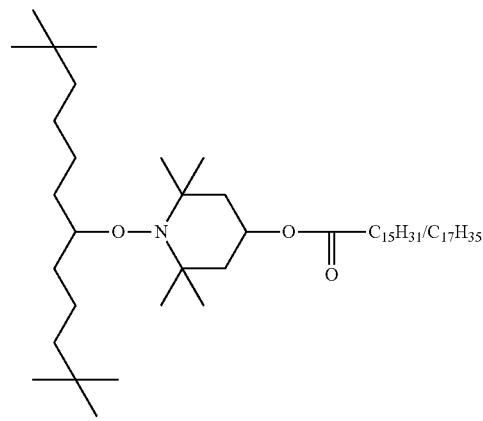

wherein $C_{15/17}$ are the main components and the alkyl radical at the N—O— has an average molecular weight of about 2000.

10. The mixture as claimed in claim 1, wherein the mixture comprises 0.2 to 10 wt % of component (A), 0.1 to 5 wt % of component (B) and 85 to 99.7 wt % of component (C).

11. The mixture as claimed in claim 1, wherein the mixture comprises 0.5 to 5 wt % of component (A), 0.2 to 2 wt % of component (B) and 93 to 99.3 wt % of component (C).

12. The mixture as claimed in claim 1, wherein the mixture comprises 0.2 to 2 wt % of component (A), 0.5 to 2 wt % of component (B) and 96 to 99.7 wt % of component (C).

13. The mixture as claimed in claim 1, wherein the thermoplastic polymer is a polyolefin.

14. The mixture as claimed in claim 1, wherein the mixture is processed into a transparent sheeting of 50-500 μm in thickness.

15. A molded article, film or fiber produced with the mixture as claimed in claim 1.

* * * * *